W. GRIKSCHEIT.
PRIMING CUP.
APPLICATION FILED SEPT. 19, 1919.

1,360,108. Patented Nov. 23, 1920.

Inventor
William Grikscheit

UNITED STATES PATENT OFFICE.

WILLIAM GRIKSCHEIT, OF DETROIT, MICHIGAN.

PRIMING-CUP.

1,360,108.  Specification of Letters Patent.  Patented Nov. 23, 1920.

Application filed September 19, 1919. Serial No. 324,818.

*To all whom it may concern:*

Be it known that I, WILLIAM GRIKSCHEIT, a citizen of the United States of America, residing at Detroit, in the county of Wayne and State of Michigan, have invented certain new and useful Improvements in Priming-Cups, of which the following is a specification, reference being had therein to the accompanying drawings.

The invention relates to priming cups and has for its principle object the reduction in cost of manufacture. In the present state of the art it is usual to provide priming cups with valve members having threaded stems, and to prevent corrosion of the threads one or both members are formed of brass or other expensive material. With certain constructions the cup proper is formed of pressed sheet metal and is secured to a threaded nipple portion by spinning over a flange. With my improved construction I form a simpler means of attachment between the pressed cup and the nipple and also greatly reduce the cost by the substitution of steel or other relatively inexpensive material for the brass in the greater part of the construction. On the other hand, corrosion of the threads is avoided by forming a relatively small member of the non-corrodible metal, this being threaded to receive the stem of the valve. Still further, this member forms the additional function of a securing means between the cup and the nipple.

In detail, A is a threaded hollow nipple, preferably formed of steel. B is a pressed sheet metal cup member for engaging the upper end of the nipple, said cup being preferably provided with a conical bottom portion which fits against a correspondingly inclined shoulder C at the upper end of the nipple. D is a hollow member which forms a bushing for a portion of the nipple A, being provided with a shoulder E for fitting against the cup B and having at its lower end a flange portion F engaging an opposite shoulder G on the nipple. The member D extends upward centrally within the cup B and is internally threaded at H to engage the correspondingly threaded stem I of the valve, said stem being bent laterally above the cup to form a handle J and being rounded at its inner end K to engage a seat L in the member D. There are also formed apertures M in the member D above the seat L through which the contents of the cup may be discharged into the hollow nipple.

To guard against corrosion and at the same time to minimize the use of expensive materials, the member D alone is formed of brass or other non-corrodible metal. As this member forms both the valve seat and the threaded socket for engaging the threaded stem of the valve, it alone is in contact with a movable part. Thus the nipple A, hub B and valve with its threaded stem and handle can all be made of steel, or other inexpensive material, and the amount of metal required for the member D is small in comparison with these other parts. Also the parts may be assembled and securely fastened to each other by a simple pressing operation, which will turn the flange G and firmly press the shoulder E toward the seat C, clamping the cup B therebetween.

Figure 1:
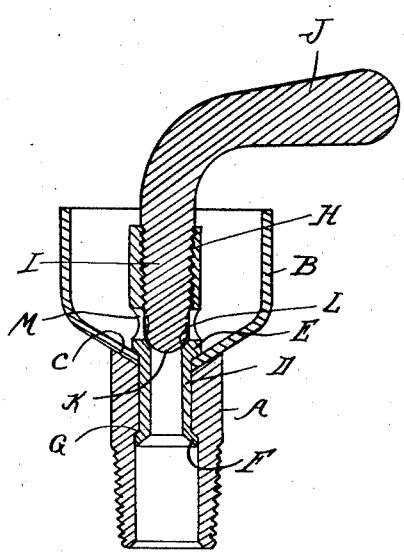
Figure 1 is a longitudinal section through the cup.
Figure 2:
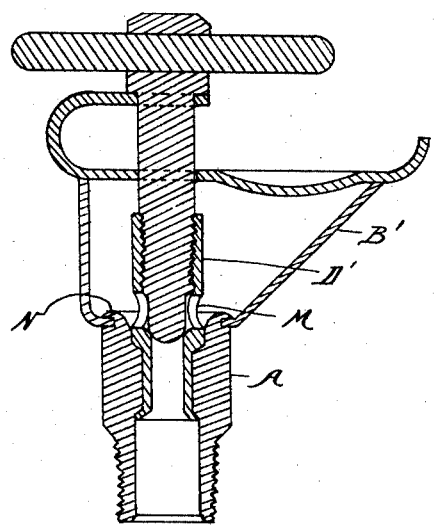
Fig. 2 is a similar view showing a modified construction.

In the modified construction shown in Fig. 2 a bushing member D', formed of brass or other non-corrodible material, is used in connection with the nipple A to form a seat for the valve and a threaded socket for the stem, but instead of forming the securing means for the cup B', the latter is attached by a flange N on the nipple. This construction in common with the construction shown in Fig. 1 has the advantage of reducing the amount of brass required, but it does not have the further advantage of securing the cup to the nipple and I therefore deem the construction shown in Fig. 1 preferable.

What I claim as my invention is:

1. The combination with a hollow nipple member, of a cup member fitting thereagainst, and a bushing engaging said nipple member and shouldered to clamp said cup member thereto.

2. The combination with a hollow nipple member, of a cup member fitting thereagainst, a bushing member engaging said nipple member and shouldered to clamp said cup member thereto, and a valve engaging said bushing member.

3. The combination with a hollow nipple member, of a cup member fitting thereagainst, a bushing member engaging said hollow nipple member and shouldered to clamp said cup member thereto, said bushing having a valve seat formed therein, and an extension within the cup member internally threaded with a lateral aperture above said seat, and a valve for engaging said seat having a threaded stem for engaging said internally threaded extension.

4. The combination with a hollow nipple member, a cup member fitting thereagainst, and a valve having a threaded stem, of a bushing member for said hollow nipple member formed of non-corrodible material, being provided with a seat for said valve and being internally threaded to engage the stem of the valve, said bushing also forming a means of attachment between said cup and hollow nipple.

5. The combination with a hollow nipple member, of a cup member fitting thereagainst, a valve having a threaded stem and a bushing member formed of non-corrodible material, being shouldered for engagement with said cup member, and an opposite shoulder upon said bushing to secure said members together, being also provided with a valve seat, and an internally threaded portion for engaging the threaded stem of the valve and having an aperture above said seat for communication with said cup.

6. A priming cup, comprising a hollow nipple member, a pressed sheet metal cup member and a valve having a threaded stem, all of said parts being formed of steel, and a hollow bushing member formed of brass or similar material engaging said hollow nipple member and being shouldered for engagement with said cup member, and an opposed shoulder on said nipple member to secure said parts together, said bushing member being further provided with an extension within said cup member internally threaded to engage said valve stem, having a seat for the valve and an aperture above said seat for communication with the cup.

7. The combination with a hollow nipple member, of a cup member fitting thereagainst, a valve having a threaded stem and a bushing member formed of non-corrodible material, being shouldered for engagement with said nipple member, and an opposite shoulder upon said bushing to secure said members together, being also provided with a valve seat, and an internally threaded portion for engaging the threaded stem of the valve and having an aperture above said seat for communication with said cup.

8. A priming cup, comprising a hollow nipple member, a pressed sheet metal cup member and a valve having a threaded stem, all of said parts being formed of steel, and a hollow bushing member formed of brass or similar material engaging said hollow nipple member and being shouldered for engagement with said nipple member, and an opposed shoulder on said nipple member to secure said parts together, said bushing member being further provided with an extension within said cup member internally threaded to engage said valve stem, having a seat for the valve and an aperture above said seat for communication with the cup.

9. The combination with a cup member, a hollow nipple member therefor, and a valve having a threaded stem, of a bushing member for said hollow nipple member formed of non-corrodible material and provided with a seat for said valve, said nipple member being internally threaded to engage the stem of the valve.

In testimony whereof I affix my signature.

WILLIAM GRIKSCHEIT.